US009313716B2

(12) United States Patent
Ukai et al.

(10) Patent No.: US 9,313,716 B2
(45) Date of Patent: Apr. 12, 2016

(54) OPERATION REGULATION METHOD, OPERATION REGULATION PROGRAM PRODUCT, MOBILE TERMINAL, VEHICULAR APPARATUS, AND VEHICULAR COMMUNICATION SYSTEM

(71) Applicant: DENSO CORPORATION, Kariya, Aichi-pref. (JP)

(72) Inventors: Hiroki Ukai, Nagoya (JP); Hiroshi Kuwahara, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/394,171

(22) PCT Filed: Apr. 17, 2013

(86) PCT No.: PCT/JP2013/002596
§ 371 (c)(1),
(2) Date: Oct. 13, 2014

(87) PCT Pub. No.: WO2013/161220
PCT Pub. Date: Oct. 31, 2013

(65) Prior Publication Data
US 2015/0056976 A1  Feb. 26, 2015

(30) Foreign Application Priority Data
Apr. 23, 2012  (JP) ................................. 2012-097688

(51) Int. Cl.
*H04W 48/04* (2009.01)
*H04M 1/60* (2006.01)
*H04M 1/725* (2006.01)

(52) U.S. Cl.
CPC ............ *H04W 48/04* (2013.01); *H04M 1/6091* (2013.01); *H04M 1/72577* (2013.01)

(58) Field of Classification Search
CPC .......... H04M 1/72577; H04M 1/6075; H04M 2250/02; H04K 3/415; H04W 48/04
See application file for complete search history.

(56) References Cited

U.S. PATENT DOCUMENTS

2010/0233998 A1  9/2010  Saito
2013/0072174 A1*  3/2013  Enty ..................... H04W 4/027
                                                        455/418

FOREIGN PATENT DOCUMENTS

CN      101820473 A    9/2010
JP      2001313698 A   11/2001
(Continued)

OTHER PUBLICATIONS

International Search Report and Written Opinion (in Japanese with English Translation) for PCT/JP2013/002596, mailed Jul. 16, 2013; ISA/JP.

(Continued)

*Primary Examiner* — Curtis Odom
(74) *Attorney, Agent, or Firm* — Harness, Dickey & Pierce, P.L.C.

(57) ABSTRACT

A mobile terminal requiring operation regulation is communicably connected with a vehicular apparatus via wireless communication and executes an application for cooperating with the vehicular apparatus. An operation regulation method performed by the mobile terminal and the vehicular apparatus includes transmitting, from the vehicular apparatus to the mobile terminal, vehicle information indicating whether a vehicle including the vehicular apparatus is in a traveling state, determining, with the mobile terminal, whether the vehicle is in the traveling state based on the vehicle information when the vehicular apparatus is connected with the mobile terminal based on handsfree communication protocol, and, when the mobile terminal determines that the vehicle is in the traveling state, performing, with the mobile terminal, a regulation process for regulating one of (i) an operation of the application for cooperating with the vehicular apparatus or (ii) all or part of functions provided to the mobile terminal.

9 Claims, 6 Drawing Sheets

(56) References Cited

FOREIGN PATENT DOCUMENTS

| | | | |
|---|---|---|---|
| JP | 2006303584 | A | 11/2006 |
| JP | 2006333505 | A | 12/2006 |
| JP | 2009140445 | A | 6/2009 |
| JP | 2010239283 | A | 10/2010 |

OTHER PUBLICATIONS

Office Action dated Dec. 31, 2015 issued in the corresponding CN application No. 201380021466.3 in Chinese with English translation.

* cited by examiner

OPERATION REGULATION METHOD, OPERATION REGULATION PROGRAM PRODUCT, MOBILE TERMINAL, VEHICULAR APPARATUS, AND VEHICULAR COMMUNICATION SYSTEM

CROSS REFERENCE TO RELATED APPLICATIONS

This application is a U.S. National Phase Application under 35 U.S.C. 371 of International Application No. PCT/JP2013/002596 filed on Apr. 17, 2013 and published in Japanese as WO 2013/161220 A1 on Oct. 31, 2013. This application is based on and claims the benefit of priority from Japanese Patent Applications No. 2012-097688 filed on Apr. 23, 2012. The entire disclosures of all of the above applications are incorporated herein by reference.

TECHNICAL FIELD

The present disclosure relates to an operation regulation method, an operation regulation program product, a mobile terminal, a vehicular apparatus, and a vehicular communication system which regulate operations corresponding to manipulations input to a mobile terminal when a vehicle is in a traveling state.

BACKGROUND ART

As already known, the related art provides a vehicular apparatus performing a cooperative operation with a mobile terminal and a vehicular communication system using the vehicular apparatus. This kind of system may regulate operation like inhibiting connection to the vehicular apparatus to improve safety during vehicle travel (for example, see Patent Literature 1).

Many users own mobile terminals that have come into widespread use. Some vehicular apparatuses are capable of connecting multiple mobile terminals. For this reason, multiple mobile terminals may be brought into a vehicle.

However, when operation regulation is performed to all of the mobile terminals connected to the vehicular apparatus, an operation of a mobile terminal, which is not necessary to be regulated, is also regulated, and a usability of the mobile terminal that is not necessary to be regulated is degraded. If a wireless communication is used to connect a mobile terminal with the vehicular apparatus, the vehicular apparatus cannot determine whether the mobile terminal is owned by a driver. Thus, the operation regulation may be performed to a mobile terminal, which is not a regulation target. In this case, identifying a regulation target mobile terminal whose operation needs to be regulated becomes more difficult when multiple mobile terminals are connected via the same wireless communication.

PRIOR ART LITERATURES

Patent Literature

Patent Literature 1: JP 2006-303584 A

SUMMARY OF INVENTION

In view of the foregoing difficulties, it is an object of the present disclosure to provide an operation regulation method, an operation regulation program product, a mobile terminal, a vehicular apparatus, and a vehicular communication system, which are capable of regulating operations of a target mobile terminal that requires an operation regulation even if a vehicular apparatus that is capable of communicating with multiple mobile terminals via the same wireless communication is used.

According to a first aspect of the present disclosure, an operation regulation method is used for a vehicular apparatus and a mobile terminal that is communicably connected with the vehicular apparatus via a wireless communication and executes an application for controlling the mobile terminal to cooperate with the vehicular apparatus. The operation regulation method includes transmitting, from the vehicular to the mobile terminal, vehicle information that indicates whether a vehicle provided with the vehicular apparatus is in a traveling state, using the wireless communication established between the mobile terminal and the vehicular apparatus, determining, with the mobile terminal, whether the vehicle is in the traveling state based on the vehicle information when the wireless communication between the vehicular apparatus and the mobile terminal is established based on a handsfree communication protocol, and performing a regulation process when the mobile terminal determines that the vehicle is in the traveling state. In the regulation process, the mobile terminal regulates one of (i) an operation of the application that controls the mobile terminal to cooperate with the vehicular apparatus or (ii) all or part of functions provided to the mobile terminal.

With the above operation regulation method, operation regulation can be properly provided to a mobile terminal that requires an operation regulation.

According to a second aspect of the present disclosure, an operation regulation program product is stored in a computer-readable non-transitory tangible storage medium and includes instructions to be executed by a computer for implementing the operation regulation method according to first aspect of the present disclosure.

With the above operation regulation program product, operation regulation can be properly provided to a mobile terminal that requires an operation regulation.

According to a third aspect of the present disclosure, a mobile terminal communicably connected with a vehicular apparatus via a wireless communication includes a terminal-side control portion and a terminal-side communication portion. The terminal-side control portion executes an application that controls the mobile terminal to cooperate with the vehicular apparatus. The terminal-side communication portion communicates with the vehicular apparatus and receives vehicle information indicating whether a vehicle provided with the vehicular apparatus is in a traveling state. When the mobile terminal is connected with the vehicular apparatus based on a handsfree communication protocol, the terminal-side control portion determines whether the vehicle is in the traveling state based on the vehicle information received by the terminal-side communication portion. When the terminal-side control portion determines that the vehicle is in the traveling state, the terminal-side control portion performs an operation regulation by regulating at least one of (i) an operation of the application that controls the mobile terminal to cooperate with the vehicular apparatus or (ii) all or part of functions provided to the mobile terminal.

With the above mobile terminal, a situation which requires an operation regulation is determined by the mobile terminal, and the operation regulation can be properly provided to the mobile terminal.

According to a fourth aspect of the present disclosure, a vehicular apparatus includes a vehicle information acquisition portion, a vehicle-side communication portion, and a vehicle-side control portion. The vehicle information acquisition portion acquires vehicle information indicating whether a vehicle is in a travelling state. The vehicle-side communication portion is communicably connected with a plurality of mobile terminals via a wireless communication and transmits the vehicle information. The vehicle-side control portion is connected with a target mobile terminal via the wireless communication based on a handsfree communication protocol. The target mobile terminal is one of the plurality of mobile terminals and requires an operation regulation. The vehicle-side control portion controls the vehicle-side communication portion to transmit the vehicle information to the target mobile terminal in response to a transmission request from the target mobile terminal or at a predetermined time interval.

With the above vehicular apparatus, the vehicle information is transmitted to a mobile terminal that requires the operation regulation. Thus, an operation regulation can be properly provided to the mobile terminal that requires the operation regulation.

According to a fifth aspect of the present disclosure, a vehicular communication system includes a mobile terminal and a vehicular apparatus communicably connected with the mobile terminal via a wireless communication and cooperating with the mobile terminal. The mobile terminal includes a terminal-side communication portion and a terminal-side control portion. The terminal-side communication portion communicates with the vehicular apparatus and receives vehicle information indicating whether a vehicle provided with vehicular apparatus is in a traveling state. The terminal-side control portion executes an application that controls the mobile terminal to cooperate with the vehicular apparatus. When the mobile terminal is connected with the vehicular apparatus based on a handsfree communication protocol, the terminal-side control portion determines whether the vehicle is in the traveling state based on the vehicle information received by the terminal-side communication portion. When the terminal-side control portion determines that the vehicle is in the traveling state, the terminal-side control portion performs an operation regulation by regulating at least one of (i) an operation of the application that controls the mobile terminal to cooperate with the vehicular apparatus or (ii) all or part of functions provided to the mobile terminal. The vehicular apparatus includes a vehicle information acquisition portion, a vehicle-side communication portion, and a vehicle-side control portion. The vehicle information acquisition portion acquires the vehicle information. The vehicle-side communication portion communicates with the mobile terminal and transmits the vehicle information to the mobile terminal. When the mobile terminal is connected with the vehicular apparatus via the wireless communication based on the handsfree communication protocol, the vehicle-side control portion controls the vehicle-side communication portion to transmit the vehicle information to the mobile terminal connected based on the handsfree communication protocol in response to a transmission request from the mobile terminal or at a predetermined time interval. The vehicular apparatus is communicably connected with a plurality of mobile terminals including the mobile terminal via the wireless communication.

With the above-mentioned vehicular communication system, operation regulation can be properly provided to a mobile terminal that requires an operation regulation.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
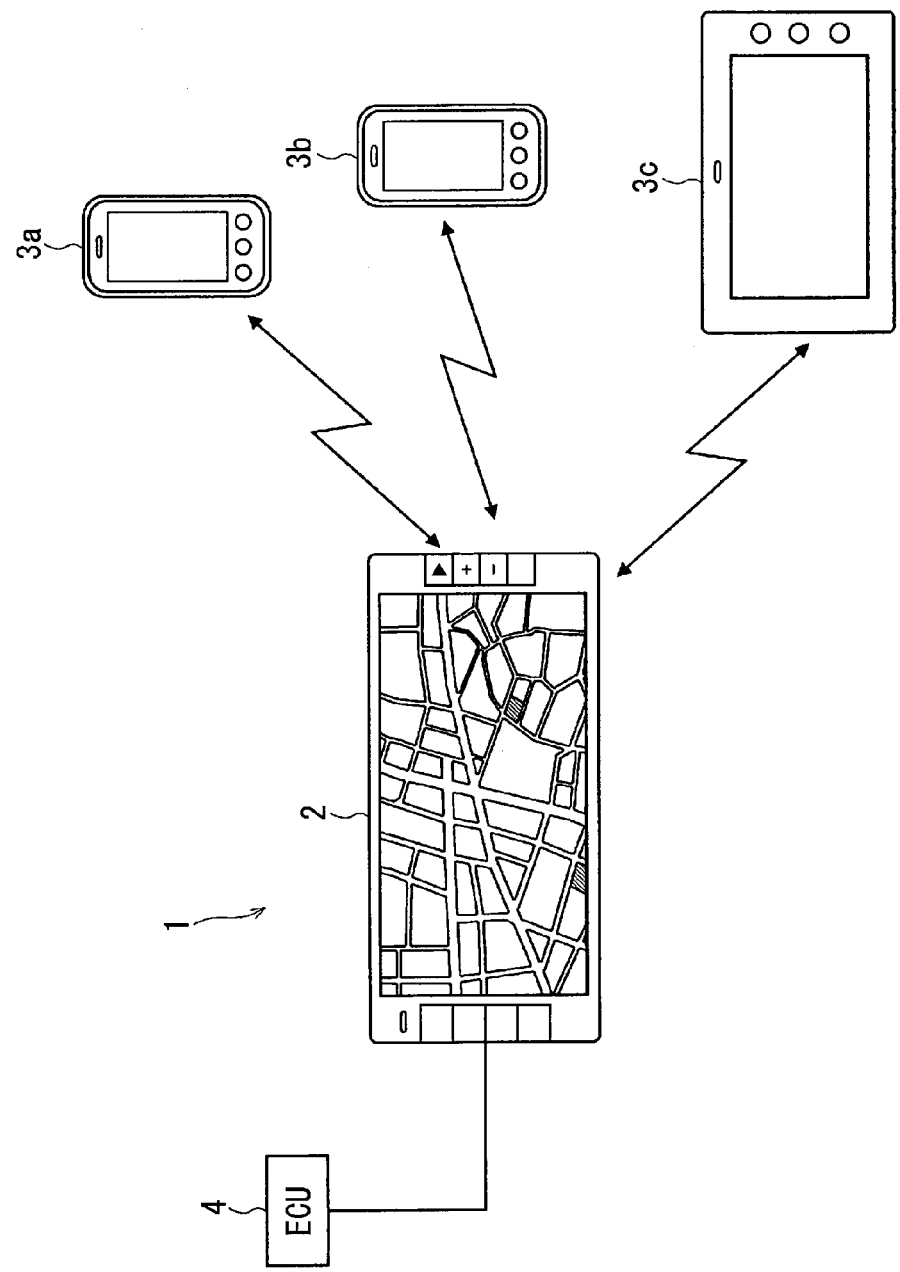
FIG. 1 is a diagram schematically illustrating a configuration of a vehicular communication system according to a first embodiment of the present disclosure.

Embodiments of the present disclosure will be described with reference to the accompanying drawings. Hereinafter, the mutually corresponding parts in the drawings are designated by the same reference symbols.

(First Embodiment)

The first embodiment of the present disclosure will be described with reference to FIGS. 1 through 5.

As illustrated in FIG. 1, a vehicular communication system 1 includes a vehicular apparatus 2 and multiple mobile terminals 3a, 3b, and 3c. The mobile terminals 3a, 3b, and 3c are hereinafter simply referred to as a mobile terminal 3 when the description is common to the mobile terminals. The vehicular communication system 1 is mounted on a vehicle, which is not illustrated. In this case, the vehicular apparatus 2 may be provided in a fixed manner, for example, in a vehicle compartment, or may be provided in a moving manner, for example, in the vehicle compartment. The vehicular apparatus 2 is also connected to an electronic control unit (ECU) 4 that controls the vehicle. FIG. 1 illustrates one ECU 4. Further, the vehicular apparatus 2 may be configured to connect with multiple ECUs via an onboard Local Area Network (LAN), such as a Controller Area Network (CAN).

Figure 2:
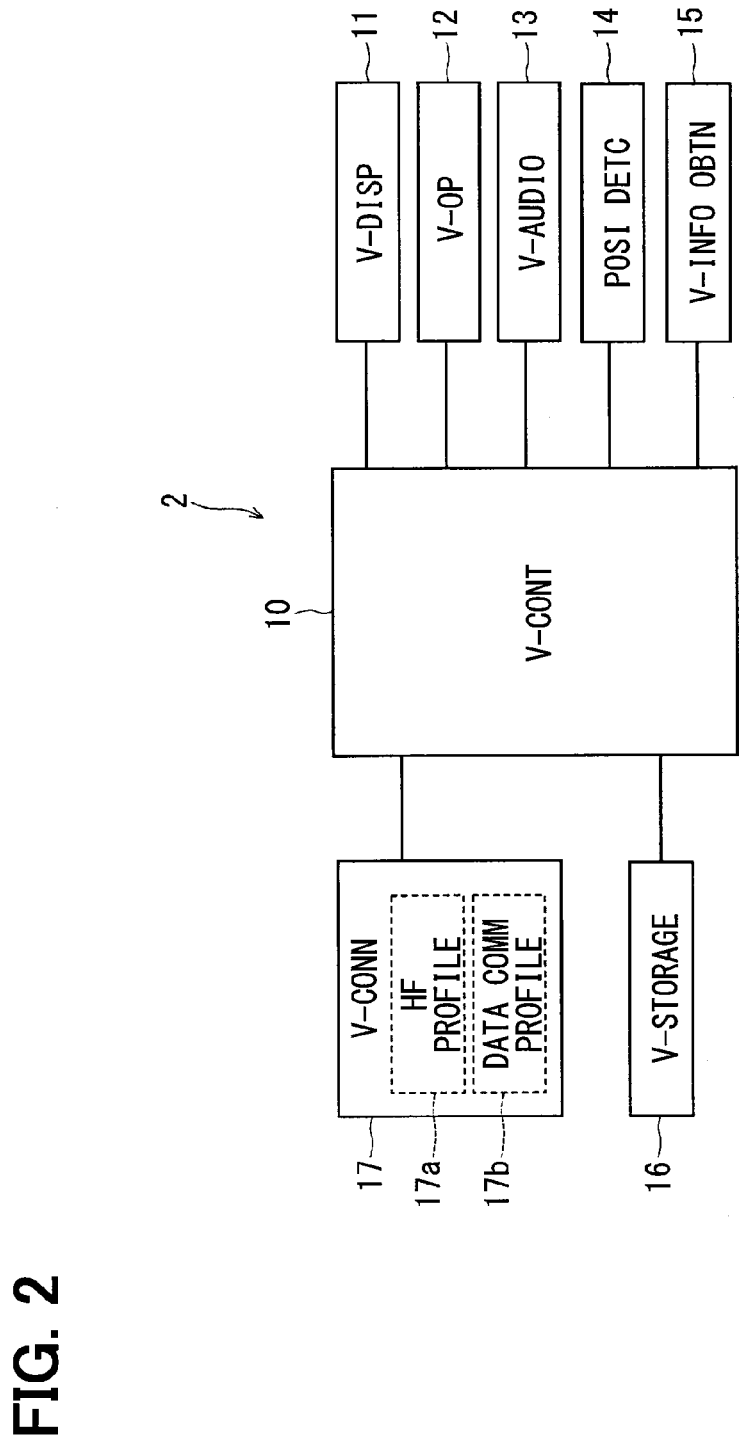
FIG. 2 is a diagram schematically illustrating a configuration of a vehicular apparatus.

As illustrated in FIG. 2, the vehicular apparatus 2 includes a vehicle-side control portion (V-CONT) 10, a vehicle-side display portion (V-DISP) 11, a vehicle-side operation portion (V-OP) 12, a vehicle-side audio input output portion (V-AUDIO) 13, a vehicle position detection portion (POSI DETC) 14, a vehicle information acquisition portion (V-INFO OBTN) 15, a vehicle-side storage portion (V-STORAGE) 16, and a vehicle-side connection portion (V-CONN) 17. In the description, the vehicle side signifies the vehicular apparatus side. The vehicle-side control portion 10 is provided by a microcomputer having a CPU, ROM, and RAM though not illustrated. The vehicle-side control portion 10 controls the whole of the vehicular apparatus 2 according to a software program stored in the ROM. The vehicle-side control portion 10 is capable of executing an application that operates cooperatively between the vehicle-side control portion 10 and the mobile terminal 3.

For example, the vehicle-side display portion 11 is provided by a liquid crystal display having color display function, an organic EL display having color display function, or a plasma display having color display function. The vehicle-side display portion 11 displays, on a screen (not illustrated) of the vehicle-side display portion 11, a map as illustrated in FIG. 1 or various information acquired from the mobile terminal 3. The acquisition of various information will be described later. The vehicle-side display portion 11 also displays, on the screen, an execution result of the application that operates cooperatively with the mobile terminal 3 as described later.

The vehicle-side operation portion 12 includes a touch panel corresponding to the vehicle-side display portion 11 and tactile switches provided around the vehicle-side display portion 11. A user uses the vehicle-side operation portion 12 to input an operation to the vehicular apparatus 2. The touch panel may be provided by any type, such as, pressure-sensitive type, electromagnetic induction type, or electrostatic induction type.

The vehicle-side audio input output portion 13 includes a speaker and a microphone, which are not illustrated. The vehicle-side audio input output portion 13 outputs, for example, a music stored in the vehicle-side storage portion 16 or a guidance voice from the vehicular apparatus 2. The vehicle-side audio input output portion 13 receives a voice operation of the user made to the vehicular apparatus 2. The vehicle-side audio input output portion 13 inputs and outputs voice during a handsfree telephone conversation. That is, the vehicle-side audio input output portion 13 also functions as a telephone conversation portion during the handsfree telephone conversation.

The vehicle position detection portion 14 includes a Global Positioning System (GPS) unit or a gyro sensor. The vehicle position detection portion 14 detects positions of the vehicle provided with the vehicular apparatus 2. The position detection using the GPS unit is already known and the detailed description is omitted. The vehicle-side control portion 10 provides the navigation function, which guides the vehicle to destinations based on the vehicle position detected by the vehicle position detection portion 14. In the present embodiment, a navigation device is applied as the vehicular apparatus 2. However, the navigation function is not necessarily provided to the vehicular apparatus. Alternatively, application software for route guidance may be installed to the vehicle-side storage portion 16 and may be executed to provide the navigation function. Hereinafter, the application software is simply referred to as an application.

The vehicle information acquisition portion 15 is connected to the ECU 4 and acquires various types of information related to the vehicle. The vehicle information acquisition portion 15 acquires information related to the vehicle, for example, a speed of the vehicle (hereinafter, referred to as vehicle speed) or air conditioner temperature settings. Among the vehicle related information acquired by the vehicle information acquisition portion 15, the information that indicates whether the vehicle is traveling is determined as vehicle information. The vehicle information may include any information capable of determining whether the vehicle is traveling. According to the present embodiment, the vehicle information includes a vehicle speed or information indicating a traveling state of the vehicle. For example, the information indicating the traveling state of the vehicle may be a data, which is set to 1 when the vehicle is traveling or is set to 0 when the vehicle is not traveling.

The vehicle-side storage portion 16 stores music data, map data used for the navigation function, various applications executed by the vehicular apparatus 2, or the like.

The vehicle-side connection portion 17 performs a communication with the mobile terminal 3. In the present embodiment, communication based on Bluetooth (registered trademark) used as the wireless communication. In the description below, Bluetooth (registered trademark) is referred to as BT, and a connection based on BT is referred to as BT connection. The vehicle-side connection portion 17 includes a handsfree profile (HF PROFILE) 17a and a data communication profile (DATA COMM PROFILE) 17b. Using these profiles, the vehicle-side connection portion 17 connects with the mobile terminal 3. Regarding BT, the handsfree profile corresponds to HANDS-FREE PROFILE (HFP), and the data communication profile corresponds to, for example, SERIAL PORT PROFILE (SPP) or ADVANCED AUDIO DISTRIBUTION PROFILE (A2DP). The HFP is also referred to as a handsfree communication protocol. The vehicle-side connection portion 17 is, respectively, connectable to the mobile terminals 3 based on different profiles (see FIG. 1). The vehicle-side connection portion 17 is also connectable to the mobile terminals 3 based on the data communication profiles. More specifically, the vehicle-side connection portion 17 can connect to the mobile terminal 3a using HFP, can connect to the mobile terminal 3b using SPP, and can connect to the mobile terminal 3c using SPP and A2DP. The vehicular apparatus 2 can connect to the mobile terminal 3a using HFP and SPP. The vehicle-side connection portion 17 corresponds to a vehicle-side communication portion.

Figure 3:
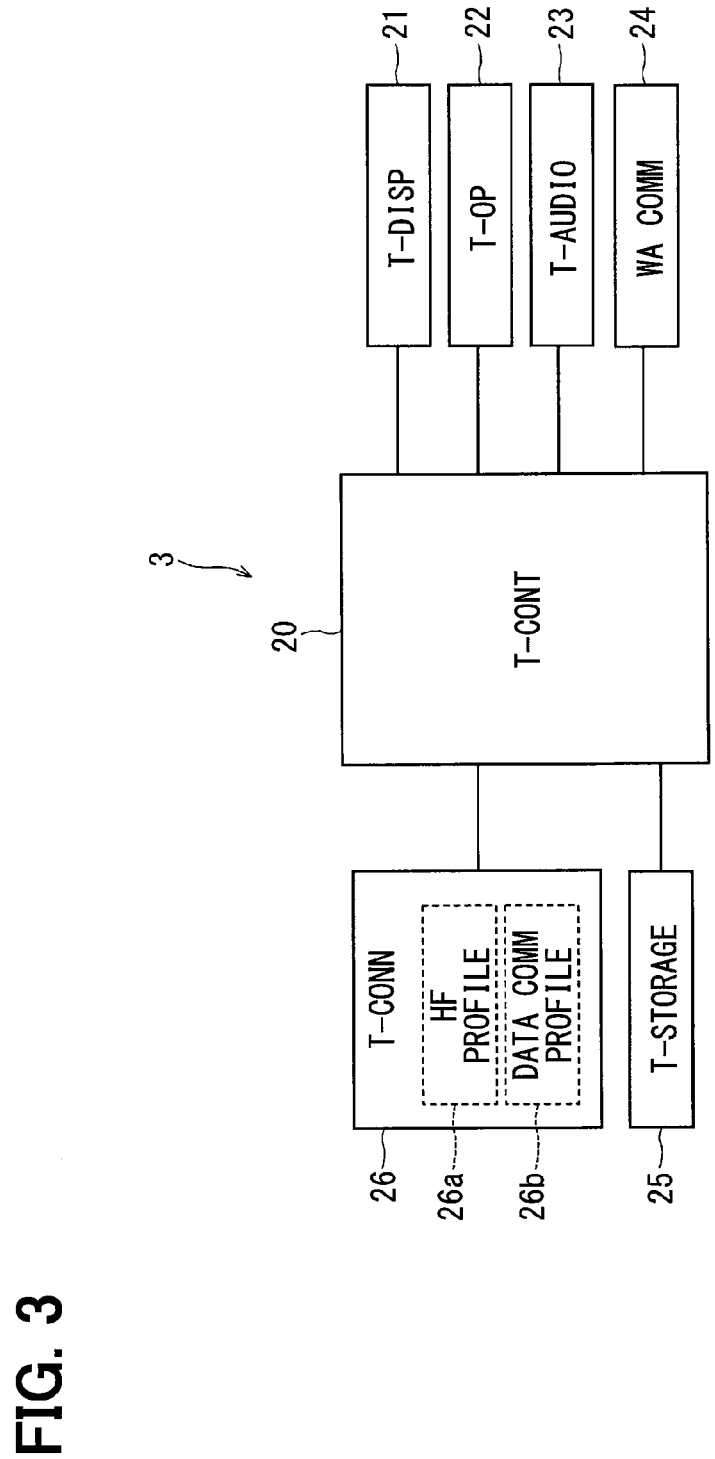
FIG. 3 is a diagram schematically illustrating a configuration of a mobile terminal.

As illustrated in FIG. 3, the mobile terminal 3 includes a terminal-side control portion (T-CONT) 20, a terminal-side display portion (T-DISP) 21, a terminal-side operation portion (T-OP) 22, a terminal-side audio input output portion (T-AUDIO) 23, a wide area communication portion (WA COMM) 24, a terminal-side storage portion (T-STORAGE) 25, and a terminal-side connection portion (T-CONN) 26. According to the present embodiment, the mobile terminal 3 includes the mobile terminal 3a and the mobile terminal 3b, which are provided by smartphones, and the mobile terminal 3c, which is provided by a tablet terminal.

The terminal-side control portion 20 is provided by a microcomputer having a CPU, ROM, and RAM though not illustrated. The terminal-side control portion 20 controls the whole of the mobile terminal 3 according to a software program stored in the ROM. As will be described later, the terminal-side control portion 20 is capable of executing an application that operates cooperatively between the terminal-side control portion 20 and the vehicular apparatus 2.

For example, the terminal-side display portion 21 is provided by a liquid crystal display having color display function or an organic EL display having color display function. The terminal-side display portion 21 displays telephone directory data and images or videos stored in the terminal-side storage portion 25 on a screen (not illustrated) of the terminal-side display portion 21. When an application cooperating with the vehicular apparatus 2 is started, the terminal-side display portion 21 also controls the screen to display a manipulation window to receive a manipulation made by the user. The manipulation made by the user activates a process to be executed by the vehicular apparatus 2. This operation will be described later in details. The terminal-side operation portion 22 includes a touch panel corresponding to the terminal-side display portion 21 and tactile switches provided around the terminal-side display portion 21.

The terminal-side operation portion 22 of the mobile terminal 3 receives operations made to the mobile terminal 3 from the user. As will be described later, the terminal-side operation portion 22 of the mobile terminal 3 acquires instruction information from the outside (user). The instruction information specifies a process to be performed by the vehicular apparatus 2. The instruction information acquisition by the terminal-side operation portion 22 of the mobile terminal 3 corresponds to an acquisition process. The touch panel may be provided by any type, such as, pressure-sensitive type, electromagnetic induction type, or electrostatic induction type.

The terminal-side audio input output portion 23 includes a microphone and a speaker (not illustrated), respectively, to receive a speech made by the user and to output a speech made by a calling partner during the telephone conversation. The terminal-side audio input output portion 23 also outputs, for example, music or video sound stored in the terminal-side storage portion 25.

The communication portion 24 provides wide area communication for connecting to a public line network or to an external network. The communication portion 24 performs telephone conversation and transmits or receives data from the external network.

The terminal-side storage portion 25 stores various applications executed by the terminal side and data saved by the user as well as the telephone directory and music.

The terminal-side connection portion 26 performs communication with the vehicular apparatus 2. As described above, in the present embodiment, the terminal-side connection portion 26 performs the wireless communication via BT. The mobile terminals 3a through 3c are BT-connected to the vehicular apparatus 2. That is, the mobile terminals 3a through 3c use the same wireless communication type to connect with the vehicular apparatus 2. Similar to the vehicular apparatus 2, the terminal-side connection portion 26 includes a handsfree profile 26a (HF PROFILE) and data communication profile 26b (DATA COMM PROFILE), and connects with the vehicular apparatus 2 using these profiles. Regarding BT, the handsfree profile corresponds to HFP, and the data communication profile corresponds to SPP or A2DP, for example. The terminal-side connection portion 26 also transmits the above-mentioned instruction information. The terminal-side connection portion 26 corresponds to a terminal-side communication portion.

The following describes an application that allows the mobile terminal 3 and the vehicular apparatus 2 to operate cooperatively with each other.

According to a related art, the vehicular apparatus 2 sets a destination based on data such as destination information and telephone numbers stored in the vehicle-side storage portion 16 to provide the navigation function for route retrieval or guidance, for example. However, data stored in the vehicle-side storage portion 16 may differ from the most recent data. For example, a new road may be built or a facility or a shop stored as destination information may be relocated. When the vehicular apparatus 2 and the mobile terminal 3 operate cooperatively with each other, the most recent data on external networks, for example, road or facility data not stored in the vehicular apparatus 2 is able to be used. With this configuration, more accurate route retrieval or route guidance is provided.

When the vehicular apparatus 2 and the mobile terminal 3 cooperate with each other, the mobile terminal 3 can also control an operation of the vehicular apparatus 2. When the user manipulates the mobile terminal 3 to enlarge a content that is displayed on the screen, for example, the mobile terminal 3 transmits the manipulation as instruction information to the vehicular apparatus 2. Based on the received instruction information, the vehicular apparatus 2 enlarges the displayed content. The mobile terminal 3 may be used as a remote controller of the vehicular apparatus 2. In this example, enlarging a displayed content signifies increasing a display scale of the content.

The mobile terminal 3 searches the network for a facility or a place and transmits position information related to the facility or the place to the vehicular apparatus 2. The searched facility or searched place can be thereby specified as a destination of route guidance. The user manipulation on the mobile terminal 3 is transmitted as instruction information to the vehicular apparatus 2. The vehicular apparatus 2 can thereby perform a process based on the instruction information.

The above-mentioned cooperative application is executed both on the vehicular apparatus 2 and on the mobile terminal 3 to enable the use of the mobile terminal 3 in the vehicle compartment.

Figure 4:
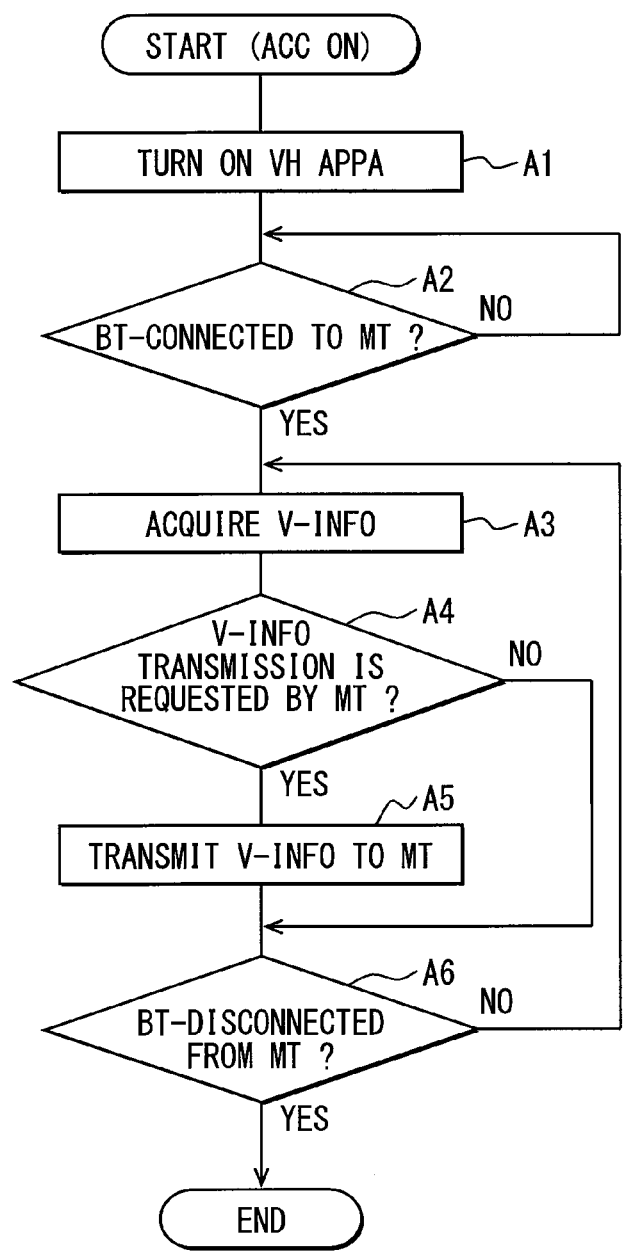
FIG. 4 is a flowchart illustrating a control process executed by the vehicular apparatus.
Figure 5:
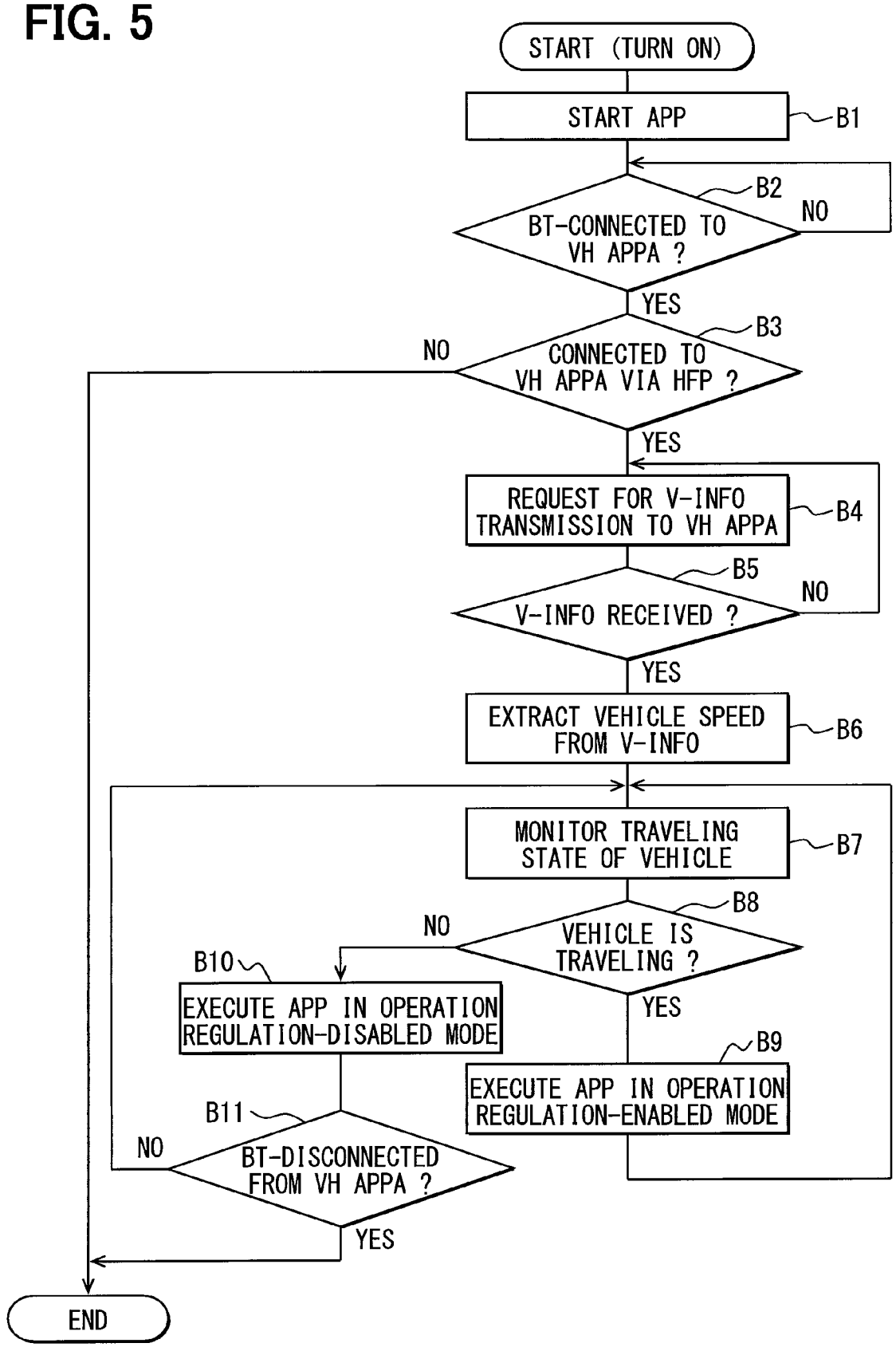
FIG. 5 is a flowchart illustrating a control process executed by the mobile terminal.

The above-mentioned configuration will be described in detail with reference to FIGS. 4 and 5. FIG. 4 is a flowchart illustrating a control process executed by the vehicular apparatus 2. FIG. 5 is a flowchart illustrating a control process executed by the mobile terminal 3. In FIGS. 4 and 5, the mobile terminal 3 is described as MT. The vehicular apparatus 2 is described as VH APPA. The application is described as APP.

As illustrated in FIG. 4, when the vehicular apparatus 2 starts (the accessory switch ACC of the vehicle is turned on) the process, the vehicular apparatus 2 is turned on (A1). The vehicular apparatus 2 determines whether itself is BT-connected to the mobile terminal 3 (MT) (A2). The process at A1 assumes that the user manually turns on the vehicular apparatus 2. Alternatively, the vehicular apparatus 2 may be automatically turned on synchronously with the turning on of ACC.

When the vehicular apparatus 2 determines that itself is not BT-connected to the mobile terminal 3 (NO at A2), the vehicular apparatus 2 waits until the BT connection is carried out. When the vehicular apparatus 2 determines that itself is BT-connected to the mobile terminal 3 (YES at A2), the vehicular apparatus 2 acquires vehicle information (V-INFO), based on which whether the vehicle is traveling can be determined (A3). The vehicular apparatus 2 then determines whether a transmission of the vehicle information is requested by the mobile terminal 3 (A4). For example, the mobile terminal 3 may not execute an application to cooperate with the vehicular apparatus 2. In such a case, the mobile terminal 3 is configured such that a receiving of the vehicle information is forbidden even if the vehicular apparatus 2 is BT-connected to the mobile terminal 3. When the vehicular apparatus 2 is not requested by the mobile terminal 3 for the transmission of the vehicle information (NO at A4), the vehicular apparatus 2 does not transmit the vehicle information and determines whether itself is BT-disconnected (the BT connection is disabled) from the mobile terminal 3 (A6).

When the vehicular apparatus 2 determines that itself is not BT-disconnected from the mobile terminal 3 (NO at A6), the vehicular apparatus 2 proceeds to A3 to re-acquire the vehicle information. The vehicular apparatus 2 then repeatedly executes the same process until receiving the request for transmission of the vehicle information from the mobile terminal 3. When the vehicular apparatus 2 determines that itself is BT-disconnected from the mobile terminal 3 (YES at A6), the vehicular apparatus 2 terminates the process in FIG. 4. The vehicular apparatus 2 periodically performs the process in FIG. 4 while the accessory switch ACC of the vehicle is in turned-on state. Namely, the vehicular apparatus 2 periodically determines whether itself is BT-connected to the mobile terminal 3 while the accessory switch ACC of the vehicle is in the turned-on state. The vehicular apparatus 2 transmits the vehicle information to the mobile terminal 3 (A5) when the BT-connected mobile terminal 3 requests for the transmission of the vehicle information (YES at A2 and A4 after A3).

The vehicular apparatus 2 determines whether itself is BT-connected to the mobile terminal 3. If the BT connection is enabled, the vehicular apparatus 2 determines whether the mobile terminal 3 requests for the transmission of the vehicle information. The vehicular apparatus 2 transmits the vehicle information in response to the transmission request from the mobile terminal 3.

The mobile terminal 3 is connectable to the vehicular apparatus 2 and executes an operation regulation program (FIG. 5) that contains an operation regulation method according to the present disclosure. In the present embodiment, the operation regulation program is built in part of the application that controls the mobile terminal 3 to cooperate with the vehicular apparatus 2. When the mobile terminal 3 starts the process (mobile terminal 3 is turned on), the mobile terminal 3 initiates the application (B1). More strictly, the mobile terminal 3 initiates the application in response to the manipulation input by the user for initiating the application. The mobile terminal 3 then determines whether itself is BT-connected to the vehicular apparatus 2 (B2). When the mobile terminal 3 determines that itself is not BT-connected to the vehicular apparatus 2 (NO at B2), the mobile terminal 3 waits until the BT connection is enabled. The process at B1 and the process at B2 may be reversed. Generally, the mobile terminal 3 is always in the turned-on state. A user gets into the vehicle and may turn on the ACC to start the vehicular apparatus 2 (see A1 in FIG. 5). At this time, the BT connection is established first. The user may then manipulate the mobile terminal 3 to initiate the application.

When the mobile terminal 3 determines that itself is BT-connected to the vehicular apparatus 2 (YES at B2), the mobile terminal 3 determines whether itself is HFP-connected to the vehicular apparatus 2 (B3). That is, the mobile terminal 3 determines whether itself is connected to the vehicular apparatus 2 based on the handsfree communication protocol. When the mobile terminal 3 determines that itself is not HFP-connected to the vehicular apparatus 2 (NO at B3), the mobile terminal 3 terminates the process. If no HFP connection is established, the mobile terminal 3 determines that itself is not used for the handsfree conversation. That is, the mobile terminal 3 determines that there is no need to perform the operation regulation, and terminates the process.

When the mobile terminal 3 determines that itself is HFP-connected to the vehicular apparatus 2 (YES at B3), the mobile terminal 3 requests the vehicular apparatus 2 to transmit the vehicle information (B4). Then, the mobile terminal 3 determines whether the vehicle information is received (B5). At B4 and B5, the mobile terminal 3 uses the SPP to request (or transmit the request information) and receive the vehicle information. Obviously, a profile other than the SPP may be used to request and receive the vehicle information.

Under HFP-connected state, the mobile terminal 3 is configured such that, once the request for the transmission of the vehicle information is made, the mobile terminal 3 intermittently repeats the request for the transmission of the vehicle information and receives the vehicle information in the background thereafter, though not illustrated in FIG. 5. This enables the process at B7 and later to monitor the vehicle traveling state. It will be described later in details. Obviously, requesting and receiving the vehicle information may be repeated at a predetermined time interval. The process at B4 and B5 corresponds to a communication process that receives the vehicle information.

When the mobile terminal 3 does not receive the vehicle information (NO at B5), the mobile terminal 3 returns to B4 and re-requests the vehicle information. The mobile terminal 3 may await the reception for a predetermined period. When the mobile terminal 3 receives the vehicle information (YES at B5), the mobile terminal 3 extracts a vehicle speed (B6) and monitors the vehicle traveling state (B7). At B7, the mobile terminal 3 monitors whether the vehicle speed is higher than 0 km/h. In this case, when the vehicle information containing information indicative of the vehicle traveling state is received, the process at B6 and B7 can be omitted under a condition that whether the vehicle is traveling can be determined based on the information. In the present embodiment, the monitoring at B7 signifies determining whether the vehicle is traveling also during the execution of the application. This will be described later.

The mobile terminal 3 determines whether the vehicle is traveling (B8). According to the present embodiment, the mobile terminal 3 determines that the vehicle is traveling if the vehicle speed is higher than 0 km/h. When the mobile terminal 3 determines that the vehicle is traveling (YES at B8), the mobile terminal 3 executes the application in operation regulation-enabling mode (B9). Namely, the mobile terminal 3, when HFP-connected, regulates operation if the vehicle is traveling. The operation regulation-enabling mode restricts input manipulation on the terminal-side operation portion 22, for example. Further, the operation regulation-enabling mode dims all or part of the manipulation window of the application displayed on the screen of the terminal-side display portion 21. The operation regulation-enabling mode thereby allows the user to identify the operation regulation state and forbids the manipulation made by the user on the dimmed portion of the manipulation window. The operation regulation-enabling mode regulates part of the application operation or all of the application operation related to cooperative operation with the vehicular apparatus 2. The operation regulation-enabling mode does not regulate the process to monitor the traveling state of the vehicle even if the operation regulation-enabling mode regulates all of the application operation related to the cooperative operation with the vehicular apparatus 2. Namely, all the application operation related to the cooperative operation with the vehicular apparatus 2 signifies all of the manipulation made by the user on the vehicular apparatus 2. Operations of applications other than the cooperative application, which cooperatively operates with the vehicular apparatus 2, may be forbidden or may be permitted.

The operation regulation-enabling may regulate all or part of functions provided to the mobile terminal 3 instead of regulating the application operation. Specifically, the operation regulation-enabling mode regulates a specified function of the mobile terminal 3 that may affect the vehicle travelling. For example, the operation regulation-enabling mode does not regulate the telephone function of the mobile terminal 3, but may regulate an Internet browse function, which requires an attention on the screen, or may even forbid the use of the mobile terminal 3.

When the operation regulation is activated, the mobile terminal 3 proceeds to B7 to monitor the vehicle traveling state. When the vehicle is in the traveling state (YES at B8), the mobile terminal 3 continues to execute the application in the operation regulation-enabling mode (B9). The process at B8 and B9 corresponds to a regulation process.

When the vehicle is not in the traveling state (NO at B8), the mobile terminal 3 executes the application in operation regulation-disabling mode (B10). The operation regulation-disabling mode disables the operation regulation. As described above, the mobile terminal 3 can thereby be used as a remote controller that may allow the vehicular apparatus 2 to perform a process corresponding to the input manipulation on the mobile terminal 3. The mobile terminal 3 then determines whether itself is BT-disconnected from the vehicular apparatus 2 (B11). When the mobile terminal 3 is BT-disconnected from the vehicular apparatus 2 (YES at B11), the mobile terminal 3 terminates the process.

When the mobile terminal 3 is not BT-disconnected from the vehicular apparatus 2 (NO at B11), the mobile terminal 3 again monitors the vehicle traveling state (B7). The mobile terminal 3 may determine that the vehicle is not in the traveling state in one time, and may determine that the vehicle is in the traveling state in the immediately next time (YES at B8). In this case, the mobile terminal 3 executes the application in the operation regulation-enabling mode (B9). Similarly, the mobile terminal 3 may determine that the vehicle is in the traveling state, and may determine that the vehicle is not in the traveling state in the immediately next time (NO at B8). In this case, the mobile terminal 3 executes the application in the operation regulation-disabling mode (B10).

The mobile terminal 3 determines whether the vehicle is traveling based on the received vehicle information. The mobile terminal 3 determines whether the vehicle is traveling based on the vehicle information when the mobile terminal 3 connects to the vehicular apparatus 2 based on the handsfree communication protocol. When determining that the vehicle is traveling, the mobile terminal 3 regulates operation of the application that controls the mobile terminal 3 to cooperate with the vehicular apparatus 2 and/or all or part of functions provided for the mobile terminal 3. The mobile terminal 3 carries out the operation regulation based on whether the mobile terminal 3 is capable of providing the handsfree conversation, but not based on whether the handsfree conversation actually takes place.

The above-mentioned embodiment can provide the following effects.

The operation regulation on a mobile terminal is recommendable if a driver owns the mobile terminal. However, as described above, it is difficult for the vehicular apparatus to determine whether the mobile terminal is owned by the driver. It is practically difficult for the vehicular apparatus to control operations of the mobile terminal.

To solve above-described difficulties, the terminal-side control portion 20 of the mobile terminal 3 executes the operation regulation program. The terminal-side control portion 20 communicates with the mobile vehicular apparatus 2 and performs the communication process in which the vehicle information indicating the traveling state of the vehicle provided with the vehicular apparatus 2 is received. The mobile terminal 3 can thereby determine whether the vehicle is traveling. Namely, the mobile terminal, not the vehicular apparatus, determines whether to make the operation regulation or not. The terminal-side control portion 20 may determine based on the received vehicle information that the vehicle is traveling when the mobile terminal 3 is connected with the vehicular apparatus 2 based on the handsfree communication protocol. In this case, the terminal-side control portion 20 performs the regulation process in which the operation of the application that controls the mobile terminal 3 to cooperate with the vehicular apparatus 2 is regulated and/or all or part of the functions provided to the mobile terminal 3. Namely, the operation regulation is made on the mobile terminal 3 that is connected to the vehicular apparatus 2 based on the handsfree communication protocol. Normally, a handsfree conversation is used by the driver. For this reason, the driver is highly likely to own the mobile terminal that establishes the connection based on the handsfree communication protocol. Thus, even when the vehicular apparatus 2 that is communicable with multiple mobile terminals 3 using the same wireless communication, the target mobile terminal 3 to which the operation regulation needs to be performed can be identified and the operation regulation can be performed to the target mobile terminal. The target mobile terminal 3 is a mobile terminal that requires the operation regulation. To the mobile terminal 3 that is connected to the vehicular apparatus 2 without using the handsfree communication protocol, no operation regulation is made. Therefore, the usability of other mobile terminals is not degraded.

Actually, however, it is difficult for the vehicular apparatus 2 to control functions of the mobile terminal 3. In the present embodiment, the mobile terminal 3 determines whether to perform the operation regulation. Thus, the operation regulation can be appropriately made on the mobile terminal 3 targeted for the operation regulation.

The terminal-side control portion 20 of the mobile terminal 3 transmits a vehicle information transmission request to the vehicular apparatus 2 to request transmission of the vehicle information. The vehicular apparatus 2 transmits the vehicle information in response to the request from the mobile terminal 3. This can prevent unnecessary transmission and reception of the vehicle information between the mobile terminal 3 and the vehicular apparatus 2.

The terminal-side control portion 20 of the mobile terminal 3 performs the acquisition process and the above-mentioned communication process. The acquisition process acquires instruction information that instructs a process to be performed by the vehicular apparatus 2. The communication process includes transmission of the instruction information to the vehicular apparatus 2. The mobile terminal 3 can be used as a remote controller for the vehicular apparatus 2 as described above. No operation regulation is made on the mobile terminal 3 that is not connected based on the handsfree communication protocol. Thus, users other than the driver can uninterruptedly use their mobile terminals 3. It is possible to improve the usability for the mobile terminal 3 that gains widespread use nowadays.

The mobile terminal 3 performs the control process that allows the vehicular apparatus 2 to perform processes corresponding to input manipulation made by the user on the mobile terminal 3. The control process includes an acquisition sub-process and a transmission sub-process. The acquisition sub-process allows the mobile terminal 3 to acquire the instruction information that indicates the manipulation made by the user. The transmission sub-process allows the mobile terminal 3 to transmit the instruction information to the vehicular apparatus 2. When determining that the vehicle is traveling, the mobile terminal 3 may regulate the acquisition sub-process that acquires the instruction information indicating the manipulation made by the user and/or the transmission sub-process that transmits the instruction information to the vehicular apparatus 2.

The terminal-side control portion 20 of the mobile terminal 3 dims all or part of a display content displayed on the screen of the terminal-side display portion 21. The terminal-side control portion 20 thereby regulates operation of the application that controls the mobile terminal 3 to cooperate with the vehicular apparatus 2 and/or all or part of functions provided to the mobile terminal 3. If the display content is unchanged in the operation regulation-enabling mode from the operation regulation-disabling mode, the user may mistakenly assume that his or her input manipulation is incorrect or a malfunction occurs to the mobile terminal 3. To reduce possibilities of the user's misinterpretation, the display content is controlled so that the user can understand that the operation regulation is enabled. With this configuration, the driver can be freed from attention to the mobile terminal 3, making it possible to improve the safety during the driving.

The mobile terminal 3 can determine by itself whether it is targeted for the operation regulation by including the terminal-side control portion 20 that executes the above-mentioned operation regulation program. As described above, the mobile terminal 3 targeted for the operation regulation can independently provide the operation regulation. No operation regulation is provided if no connection is established based on the handsfree communication protocol. Thus, a degradation of the usability of the mobile terminals is restricted.

When the vehicular apparatus 2 connects to the multiple mobile terminals 3 using the same wireless communication, the vehicular apparatus 2 transmits the vehicle information only to the mobile terminal 3 that has established the connection based on the handsfree communication protocol. The vehicular apparatus 2 transmits the vehicle information in response to the transmission request from the mobile terminal 3. This can reduce process loads on the vehicular apparatus 2.

The mobile terminal 3 targeted for the operation regulation can independently provide the operation regulation also in the vehicular communication system 1 that includes the above-mentioned mobile terminals 3 and the vehicular apparatus 2. No operation regulation is provided if no connection is established based on the handsfree communication protocol. Thus, a degradation of the usability of the mobile terminals is restricted.

The mobile terminal 3 provides the operation regulation under the condition that the connection for handsfree conversation is established, not under that the handsfree conversation is actually performed. This can reduce possibility that the driver inadvertently manipulates the mobile terminal.

The above-mentioned operation regulation method may be included in a non-transitory tangible computer-readable storage medium as an operation regulation program product, which contains instructions to implement the operation regulation method and is able to be executed by the computer.

(Second Embodiment)

The second embodiment of the present disclosure will be described with reference to FIG. 6. The second embodiment differs from the first embodiment in the process on the vehicular apparatus. The second embodiment has similar configurations of the mobile terminal, the vehicular apparatus, and the vehicular communication system with the first embodiment. The mobile terminal process according to the second embodiment is similar to the mobile terminal process according to the first embodiment.

Figure 6:
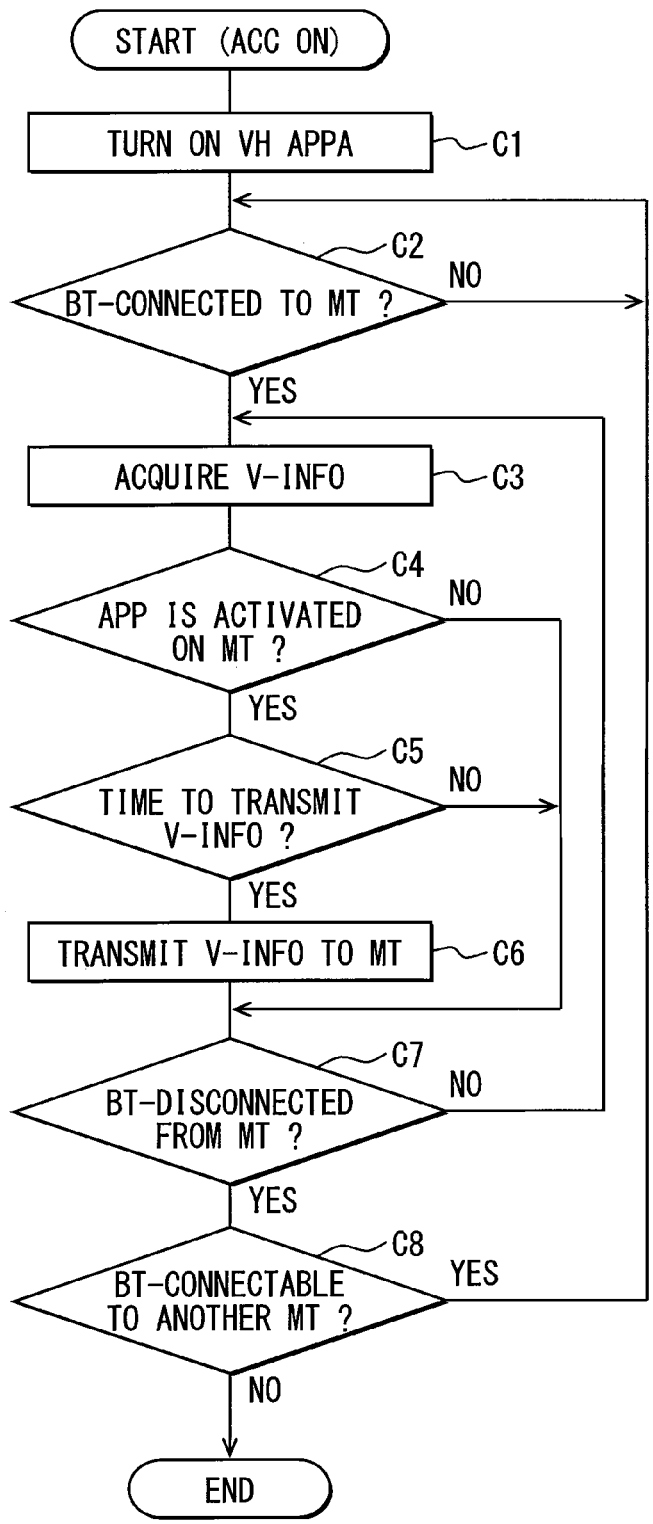
FIG. 6 is a flowchart illustrating a control process executed by a vehicular apparatus according to a second embodiment of the present disclosure.

As illustrated in FIG. 6, when the process starts (the ACC is turned on), the vehicular apparatus 2 is turned on (C1). The vehicular apparatus 2 determines whether itself is BT-connected to the mobile terminal 3 (MT) (C2). When the vehicular apparatus 2 determines that itself is not BT-connected to the mobile terminal 3 (NO at C2), the vehicular apparatus 2 waits until the BT connection is enabled. When the vehicular apparatus 2 determines that itself is BT-connected to the mobile terminal 3 (YES at C2), the vehicular apparatus 2 acquires the vehicle information (C3). The vehicular apparatus 2 determines whether the application controls the mobile terminal 3 to cooperate with the vehicular apparatus 2 is activated on the mobile terminal 3 (C4). Specifically, after the startup, the vehicular apparatus 2 may acquire, from the mobile terminal 3, activation information of the cooperative application which indicates whether the cooperative application is activated when the BT connection is established at C2. Alternatively, the vehicular apparatus 2 may receive the activation information which indicates whether the cooperative application is activated from the mobile terminal 3 during the operation. Once the application is determined to be active, the activation state may be maintained until the BT connection to the mobile terminal 3 is disabled or until the mobile terminal 3 notifies termination of the application.

When the cooperative application is active on the mobile terminal 3 (YES at C4), the vehicular apparatus 2 determines whether vehicle information transmission time is reached (C5). In the present embodiment, the vehicle information transmission time is set after an elapse of a predetermined time interval from the previous transmission of the vehicle information during the operation. If the transmission time is reached (YES at C5), the vehicular apparatus 2 transmits the vehicle information to the mobile terminal 3 (C6). The vehicular apparatus 2 periodically transmits the vehicle information while the cooperative application is active on the mobile terminal 3. In this case, the mobile terminal 3 need not request for the vehicle information to the vehicular apparatus 2. Obviously, the process at C6 may be replaced by A4 in FIG. 4 to determine whether the mobile terminal 3 requests for the transmission of the vehicle information. In this case, the mobile terminal 3 is configured to request the vehicle information periodically or in the background.

When transmitting the vehicle information, the vehicular apparatus 2 determines whether itself is BT-disconnected from the mobile terminal 3 (C7). When the BT connection remains active (NO at C7), the vehicular apparatus 2 returns to C3 and repeats the same process. The vehicular apparatus 2 directly proceeds to C7 if the application is inactive on the mobile terminal 3 (NO at C4) or the transmission time is not reached (NO at C5).

When the vehicular apparatus 2 is BT-disconnected from the mobile terminal 3 (YES at C7), the vehicular apparatus 2 determines whether the BT connection is available, or more strictly, determines whether other mobile terminals 3 are connectable based on the handsfree communication protocol (C8). For example, suppose that the driver changes to another person. In such a case, the user may disable the BT connection between the mobile terminal 3 and the vehicular apparatus 2. As another example, suppose that a mobile terminal 3 of a passenger is firstly BT-connected with the vehicular apparatus 2. In such a case, the passenger may disable the BT connection of the mobile terminal 3 to the vehicular apparatus 2, and the driver connects the mobile terminal 3 for the handsfree conversation. In this case, if the vehicular apparatus 2 passively await BT connection from other mobile terminals, the mobile terminal 3 of the driver may maintain in a BT-disconnected state from the vehicular apparatus 2.

Regarding above-described difficulty, at C8, the vehicular apparatus 2 actively searches for other mobile terminals 3 when the mobile terminal 3 in BT-connection with the vehicular apparatus 2 becomes disconnected from the vehicular apparatus 2. If there exists another mobile terminal 3 that is capable of connecting with the vehicular apparatus 2 via BT connection (YES at C8), the vehicular apparatus 2 BT-connects to the mobile terminal 3 and returns to C2 to repeat the same process. In FIG. 6, the process terminates if there is no other mobile terminal 3 capable of BT connection (NO at C8). Alternatively, the vehicular apparatus 2 may return to C2 and await the next BT connection.

According to the present embodiment, when the prior BT-connected mobile terminal 3 becomes disconnected from the vehicular apparatus 2, the vehicular apparatus 2 and the vehicular communication system 1 perform active BT-connection to other available mobile terminals 3 that is capable of performing BT connection. This configuration can prevent a continuous BT-disconnected state of the mobile terminal 3 owned by the driver. Similar to the first embodiment, the vehicular apparatus 2 and the vehicular communication system 1 including the vehicular apparatus 2 can perform the operation regulation only to the mobile terminal 3 targeted for the operation regulation. No operation regulation is performed if no connection is established based on the handsfree communication protocol. Thus, a degradation of the usability of the mobile terminals is restricted.

(Other Embodiments)

In the foregoing embodiments, the mobile terminal 3 includes the wide area communication portion 24. As another example, the communication portion 24 is not necessarily provided to the mobile terminal 3 if communication connection to the vehicular apparatus 2 is ensured.

In the foregoing embodiments, the operation regulation program is contained in part of the cooperative application. Alternatively, the mobile terminal 3 may execute the operation regulation program independently from the vehicular apparatus 2. That is, the communication process for transmitting and receiving the vehicle information is also contained in the "cooperative application with the vehicular apparatus." In this case, the operation regulation program may determine whether to provide the operation regulation when the handsfree communication protocol is used to establish the connection. Each application may perform the operation regulation according to the determination result. This can enable a sharing of the operation regulation process within the multiple applications. Thus, a program size of each application is reduced, and a quantity of the applications to which the operation regulation can be applied is increased. Similarly, the operation regulation can be applied to functions of the mobile terminal 3 according to determination results of the operation regulation program.

The foregoing embodiments described Bluetooth (registered trademark) as an example of the wireless communication, but the present disclosure is not limited to Bluetooth communication. It may be favorable to use other type of wireless communication, such as, wireless LAN including Wi-Fi or wireless USB, which is a wireless version of Universal Serial Bus (USB), for example. The handsfree communication protocol is not limited to voice conversation but also includes a video conversation.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. An operation regulation method, which is performed by a mobile terminal that requires an operation regulation and a vehicular apparatus, the mobile terminal being communicably connected with the vehicular apparatus via a wireless communication and executing an application that controls the mobile terminal to cooperate with the vehicular apparatus, the operation regulation method comprising:

transmitting, from the vehicular to the mobile terminal, vehicle information that indicates whether a vehicle provided with the vehicular apparatus is in a traveling state, using the wireless communication established between the mobile terminal and the vehicular apparatus based on a data communication protocol;

determining, with the mobile terminal, whether the vehicle is in the traveling state based on the vehicle information when the wireless communication between the vehicular apparatus and the mobile terminal is established based on a handsfree communication protocol other than the data communication protocol;

performing a regulation process when the mobile terminal determines that the vehicle is in the traveling state, in the regulation process, the mobile terminal regulating one of (i) an operation of the application that controls the mobile terminal to cooperate with the vehicular apparatus or (ii) all or part of functions provided to the mobile terminal; and determining, with the mobile terminal, whether the wireless communication between the mobile terminal and the vehicular apparatus is established based on the data communication protocol but not based on the handsfree communication protocol in order to disable the regulation process.

2. The operation regulation method according to claim 1, wherein the vehicular apparatus communicates, via the same wireless communication, with a plurality of mobile terminals including the mobile terminal.

3. The operation regulation method according to claim 1, further comprising:

transmitting, from the mobile terminal to the vehicular apparatus, a vehicle information transmission request that requests for a transmission of the vehicle information; and transmitting, from the vehicular apparatus to the mobile terminal, the vehicle information in response to the vehicle information transmission request.

4. The operation regulation method according to claim 1, wherein the mobile terminal further performs a control process that controls the vehicular apparatus, via the application, to perform a process corresponding to a manipulation made by a user on the mobile terminal, wherein the control process includes an acquisition sub-process that acquires instruction information indicating the manipulation made by the user and a transmission sub-process that transmits the instruction information to the vehicular apparatus, and wherein, when the mobile terminal determines that the vehicle is in the traveling state, the mobile terminal regulates at least one of the acquisition sub-process or the transmission sub-process in the regulation process.

5. The operation regulation method according to claim 1, displaying, on a screen of the mobile terminal, all or part of a display window of the application in an identifiable manner during the regulation process.

6. An operation regulation program product stored in a computer-readable non-transitory tangible storage medium, comprising instructions to be executed by a computer for implementing the operation regulation method according to claim 1.

7. A mobile terminal communicably connected with a vehicular apparatus via a wireless communication, the mobile terminal comprising:

a terminal-side control portion executing an application that controls the mobile terminal to cooperate with the vehicular apparatus;

a terminal-side communication portion communicating with the vehicular apparatus based on a data communication protocol and receiving vehicle information indicating whether a vehicle provided with the vehicular apparatus is in a traveling state, wherein:

when the mobile terminal is connected with the vehicular apparatus based on a handsfree communication protocol other than the data communication protocol, the terminal-side control portion determines whether the vehicle is in the traveling state based on the vehicle information received by the terminal-side communication portion; and when the terminal-side control portion determines that the vehicle is in the traveling state, the terminal-side control portion performs an operation regulation by regulating at least one of (i) an operation of the application that controls the mobile terminal to cooperate with the vehicular apparatus or (ii) all or part of functions provided to the mobile terminal; and a determination portion determining whether the wireless communication between the mobile terminal and the vehicular apparatus is established based on the data communication protocol but not based on the handsfree communication protocol in order to disable the operation regulation.

8. A vehicular communication system comprising:

a mobile terminal; and a vehicular apparatus communicably connected with the mobile terminal via a wireless communication and cooperating with the mobile terminal, wherein the mobile terminal includes:

a terminal-side communication portion communicating with the vehicular apparatus based on a data communication protocol and receiving vehicle information indicating whether a vehicle provided with vehicular apparatus is in a traveling state; and a terminal-side control portion executing an application that controls the mobile terminal to cooperate with the vehicular apparatus, wherein:

when the mobile terminal is connected with the vehicular apparatus based on a handsfree communication protocol other than the data communication protocol, the terminal-side control portion determines whether the vehicle is in the traveling state based on the vehicle information received by the terminal-side communication portion; and when the terminal-side control portion determines that the vehicle is in the traveling state, the terminal-side control portion performs an operation regulation by regulating regulates at least one of (i) an operation of the application that controls the mobile terminal to cooperate with the vehicular apparatus or (ii) all or part of functions provided to the mobile terminal; and a determination portion determining whether the wireless communication between the mobile terminal and the vehicular apparatus is established based on the data communication protocol but not based on the handsfree communication protocol in order to disable the operation regulation, wherein the vehicular apparatus includes:

a vehicle information acquisition portion acquiring the vehicle information;

a vehicle-side communication portion communicating with the mobile terminal and transmitting the vehicle information to the mobile terminal; and a vehicle-side control portion, wherein, when the mobile terminal is connected with the vehicular apparatus via the wireless communication based on the handsfree communication protocol, the vehicle-side control portion controls the vehicle-side communication portion to transmit the vehicle information to the mobile terminal connected based on the handsfree communication protocol in response to a transmission request from the mobile terminal or at a predetermined time interval, and wherein the vehicular apparatus is communicably connected with a plurality of mobile terminals including the mobile terminal via the wireless communication.

9. The vehicular communication system according to claim 8, wherein, when the wireless communication established between the vehicular apparatus and the mobile terminal based on the handsfree communication protocol is disconnected, the vehicle-side control portion searches for another one of the plurality of mobile terminals, which is connectable based on the handsfree communication protocol, and establishes a connection with the another one of the plurality of mobile terminals based on the handsfree communication protocol.

* * * * *